US010851657B2

(12) United States Patent
Polo Filisan et al.

(10) Patent No.: US 10,851,657 B2
(45) Date of Patent: Dec. 1, 2020

(54) NON-INTRUSIVE MEASUREMENT OF THE PITCH OF A BLADE

(71) Applicant: Safran Aircraft Engines, Paris (FR)

(72) Inventors: Gilles Polo Filisan, Moissy-Cramayel (FR); Titouan Alexis Andre Roger Bouillard, Moissy-Cramayel (FR); Jerome Dias, Pechabou (FR); Fabien Julien Mouries, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 62 days.

(21) Appl. No.: 16/220,213

(22) Filed: Dec. 14, 2018

(65) Prior Publication Data

US 2019/0195076 A1 Jun. 27, 2019

(30) Foreign Application Priority Data

Dec. 14, 2017 (FR) ..................................... 17 62179

(51) Int. Cl.
*F01D 7/00* (2006.01)
*B64C 11/30* (2006.01)
*G01B 11/26* (2006.01)

(52) U.S. Cl.
CPC ................ *F01D 7/00* (2013.01); *B64C 11/30* (2013.01); *G01B 11/26* (2013.01); *F05D 2220/30* (2013.01); *F05D 2240/24* (2013.01); *F05D 2260/70* (2013.01); *F05D 2260/80* (2013.01)

(58) Field of Classification Search
CPC ....... G01B 11/26; G01B 11/272; G01B 11/16; G01B 11/167; F01D 25/285; F01D 7/00; G01M 15/14; B64C 11/30

USPC ........................................................ 73/112.05
See application file for complete search history.

(56) References Cited

U.S. PATENT DOCUMENTS

| 4,948,337 A | 8/1990 | Martin et al. |
| 6,292,584 B1* | 9/2001 | Dulaney ............. B23K 26/032 382/151 |
| 7,062,861 B2* | 6/2006 | O'Mahony .......... G01B 11/002 33/286 |

(Continued)

FOREIGN PATENT DOCUMENTS

| DE | 10 2008 042 023 A1 | 3/2010 |
| DE | 10 2009 007 938 A1 | 8/2010 |

OTHER PUBLICATIONS

French Preliminary Search Report dated May 2, 2018 in French Patent Application No. 1762179 (with English translation of Category of Cited Documents), citing documents AA, AB, AC, AO and AP therein, 3 pages.

*Primary Examiner* — Courtney D Heinle
*Assistant Examiner* — Michael K. Reitz
(74) *Attorney, Agent, or Firm* — Oblon, McClelland, Maier & Neustadt, L.L.P.

(57) ABSTRACT

A blade pitch measuring device of an un-ducted fan of a turbomachine, the fan including a hub, at least one platform rotatable with respect to the hub and at least one blade mounted on the platform, the device includes at least one first visual marker attached to the platform, at least one second visual marker attached to the hub, the first and the second visual marker forming a pattern which evolves depending on the pitch of the blade, and at least one optical acquisition device, the optical acquisition device being configured to capture an image of the pattern so as to deduce from it the pitch of the blade.

8 Claims, 8 Drawing Sheets

(56) References Cited

U.S. PATENT DOCUMENTS

2010/0290909 A1 11/2010 Greciet et al.
2011/0103933 A1 5/2011 Olesen et al.

\* cited by examiner

NON-INTRUSIVE MEASUREMENT OF THE PITCH OF A BLADE

GENERAL TECHNICAL FIELD AND PRIOR ART

The present invention relates to the field of turbomachines comprising a variable pitch propeller or fan.

Different turbomachine architectures make use of a variable pitch propeller (turboprop, open rotor) or fan.

This variability allows the turbomachine to adapt to variable flight conditions by maintaining a favorable air incidence angle on the blades.

The variability of pitch is particularly necessary for rotors having a low pressure ratio, such as the propellers of turboprops and the fans of turbomachines having a high bypass ratio (ratio between the flow rate of the secondary (cold) flow and the flow rate of the primary flow (which passes through the primary body)).

In order to obtain servo control over the pitch of the blades, it is necessary to accurately detect the pitch of the blades.

During the development of this type of system, particularly in order to study the behavior of subassemblies or subsystems, test models are created for the purpose of simulating the operation of the system.

Due to the high complexity of this type of system, taking into account the number of moving parts, a measuring system internal to the fan would be particularly difficult to design and produce.

Conventional sensors would be complicated to integrate due to constraints of temperature and relative mobility of the different elements.

Moreover, the use of wireless data transmission systems is proscribed due to constraints connected with numerous control or measuring devices operating simultaneously during the operation of such experimental models.

GENERAL PRESENTATION OF THE INVENTION

A first goal of the invention is to allow non-intrusive measurement of the pitch of the airfoils or blades of the propeller (or fan, or bladed wheel). By non-intrusive is meant that the pitch measuring device is external to the fan (or propeller), at least as regards its means of acquisition.

Another goal of the invention is to propose an accurate measurement of pitch. What is meant by accurate is that the minimum pitch accuracy is comprised between 0.01 and 1 degree of angle.

Another goal of the invention is to measure the pitch during the rotation of the element comprising the airfoils or the blades.

Another goal of the invention is to measure simultaneously the blade pitch of two external propellers of which the respective pitches are independent.

Another aim of the invention is to limit the emission of electromagnetic signals.

For this purpose, the invention proposes a blade pitch measuring device of an un-ducted fan of a turbomachine, the fan including:
a. a hub,
b. at least one platform rotatably movable with respect to the hub and
c. at least one blade mounted on the platform,
the device being characterized in that it comprises:
at least one first visual marker attached to the platform, at least one second visual marker attached to the hub, the first and the second visual marker forming a pattern which evolves depending on the pitch of the blade, and
at least one optical acquisition device, the optical acquisition device being configured to capture an image of the pattern so as to deduce the pitch of the blade from the image of the pattern.

In this manner, the pitch of the blade is measured with high accuracy without the measuring device having any mechanical interaction with the blade or the platform.

The use of an optical acquisition device also allows limiting the emission of electromagnetic signals for transmitting the data acquired.

The invention can be optionally but advantageously completed by the following features, taken alone or in combination:
the device also includes a processing module including a memory, a processor and a communication device, the communication device being configured to communicate the images captured by the optical acquisition device to the processor, the memory including instructions, the processor being configured to implement the instructions of the memory so as to detect the pattern in the image and to deduce the pitch of the blade from the pattern;
the device also comprises:
a motor configured to rotate the hub, and
a device for acquiring an angular position of the hub configured to deliver a signal depending on the angular position of the hub,
the processor being configured to cause the triggering of the optical acquisition device depending on the signal; in this manner, the measurement of the pitch can be carried out during the rotation of the hub;
the device also includes at least one light source directed toward a zone including the pattern, so as to increase the light intensity in the zone; in this manner, the picture taken by the optical acquisition device is clear despite the shutter speed necessary for taking a picture of a rotating blade;
the optical acquisition device is mounted on a movable support comprising at least one actuator allowing an adjustment of an orientation and/or a position of the optical acquisition device with respect to the hub; in this manner, the orientation of the optical acquisition device can be optimized to maximize the quality of the pictures;
the device also includes a sensor configured to determine a rotation speed of the hub and a control system configured to obtain servo control of the position of the optical acquisition device depending on the rotation speed of the hub; in this manner, the orientation of the optical acquisition device is optimal regardless of the geometric configuration caused by the rotation of the fan (or hub);
the optical acquisition device comprises a video camera;
the turbomachine comprises two fans and the device comprises at least one optical acquisition device per fan, preferably two optical acquisition devices per fan; in this manner, it is possible to measure simultaneously the pitch of two propellers.

According to a second aspect, the invention also proposes a method for measuring the pitch of a blade by means of such a blade pitch measuring device, including the steps of:
a. Acquiring an image of a pattern by means of an optical acquisition device,
b. Detecting the pattern in the acquired image, c. Analysis of the detected pattern so as to deduce a value of the pitch of the blade from the pattern.

Such a method can optionally but advantageously also comprise a calibration step during which the fan and the device are digitally simulated so as to simulate the position of a blade for at least one pitch value, thus forming a configuration of the pattern corresponding to the simulated pitch value, so as to assign a reference pitch value for the simulated configuration of the pattern.

BRIEF DESCRIPTION OF THE DRAWINGS

Other features and advantages of the invention will be revealed by the description that follows, which is purely illustrative and not restrictive, and must be read with reference to the appended figures in which.

DESCRIPTION OF ONE OR MORE MODES OF IMPLEMENTATION AND EMBODIMENTS

Device:

The invention applies to a turbomachine comprising an un-ducted fan (or propeller), said fan including:
 a. a hub 3,
 b. at least one platform 2 rotatably movable with respect to the hub 3 and
 c. at least one blade 1 mounted on the platform 2.

It will be noted that hereafter, the terms "fan" and propeller are considered to be synonyms, the invention being applicable mutatis mutandis to both types of assemblies.

Figure 1:
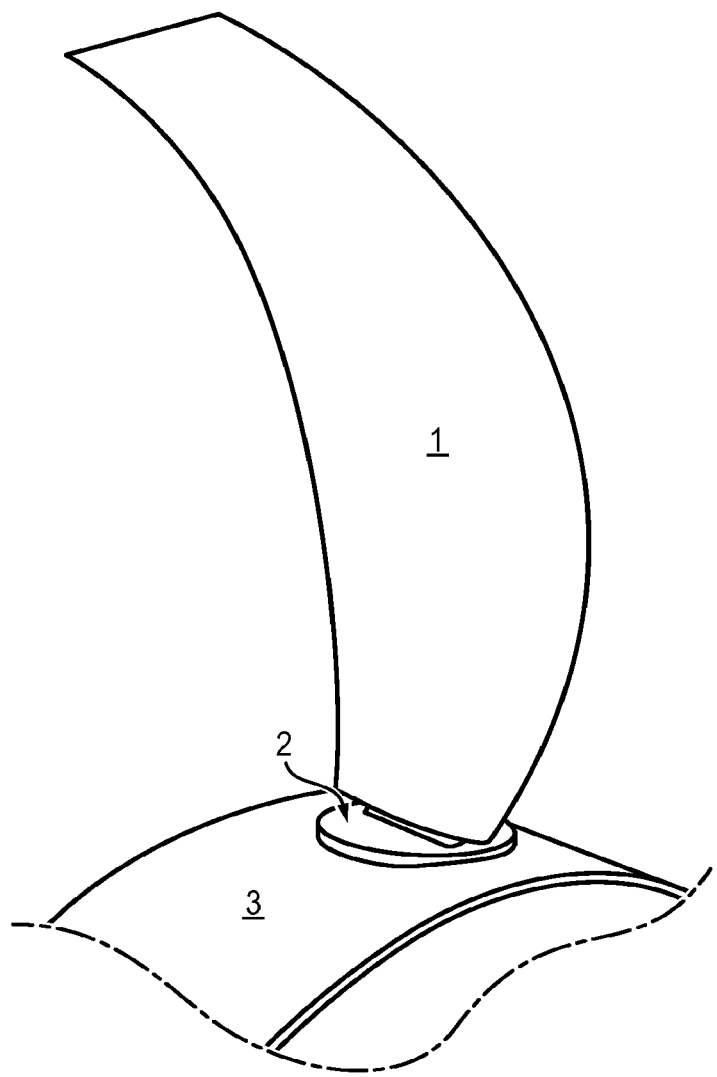
FIG. 1 is a 3D schematic of a blade integral with a platform rotatably mounted on a hub.
Figure 2:
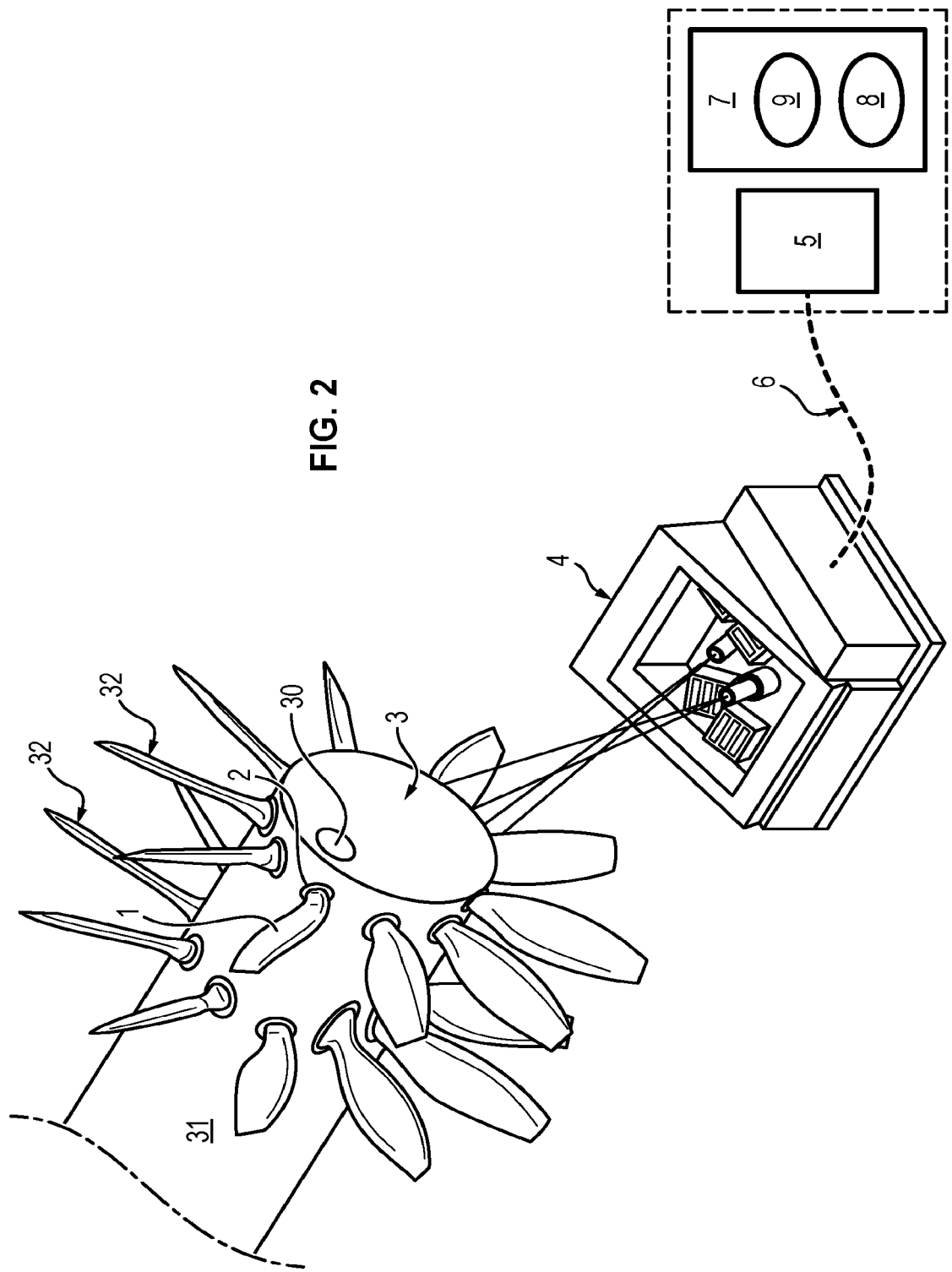
FIG. 2 is a 3D schematic of a turbomachine and of a pitch measuring device conforming to the invention.

With reference to FIG. 2, a turbomachine 31 with an un-ducted fan 32, also designated by the term "open rotor," can have at least one or two fans 32, which can then be contra-rotating.

Hereafter, the invention will be more particularly described in the case where the turbomachine comprises two fans 32. It will naturally be understood that the invention also applies to the case where the number of fans is different.

The fans 32 extend along a longitudinal axis X and each have a plurality of blades 1 each extending along its own radial axis.

Pitch, i.e. the angle of rotation of a blade 1 around the axis along which it extends, is adjustable depending on the phase of flight.

The blade 1 extends radially from the platform 2. The platform 2 is rotatably mounted on the hub 3, the hub 3 being cylindrical overall and extending along the longitudinal axis X of the turbomachine.

The hub 3 is rotatably mounted along the axis X of the turbomachine 31, the turbomachine 31 including a motor rotating the hub 3.

The hub 3 includes an angular position measuring device 30.

The invention relates to a blade 1 pitch measuring device 4 comprising:
 at least one first visual marker 13 attached to the platform 2,
 at least one second visual marker 14 attached to the hub 3, the first and the second visual marker 13, 14 forming a pattern 15 which evolves depending on the pitch of the blade 1, and
 at least one optical acquisition device 10, the optical acquisition device 10 being configured to capture an image of the pattern 15 so as to deduce from it the pitch of the blade 1.

Figure 4:
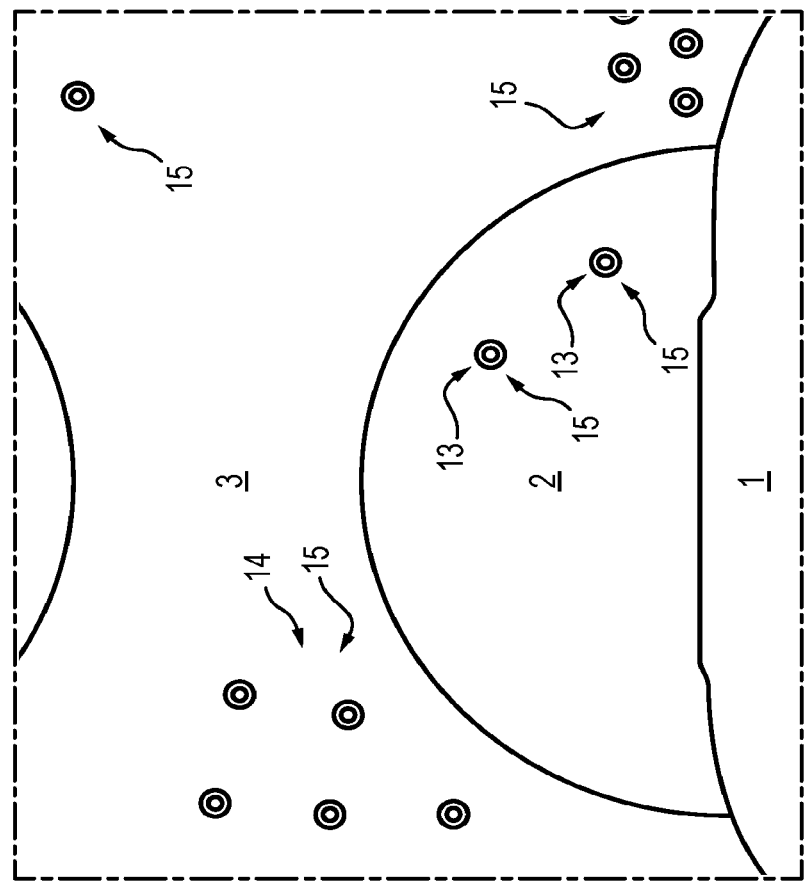
FIG. 4 is a schematic representation of a pattern conforming to the invention allowing the pitch of a blade to be deduced.

The first visual marker 13 is placed on an external surface visible from the platform 2. For example, the first visual marker 13 can include, as illustrated in FIG. 4, a plurality of points or beads.

The second visual marker 14 is placed on a visible external surface visible of the hub 3. For example, the second visual marker 14 can include, as illustrated in FIG. 4, a plurality of points or beads.

The position of the first marker 13 of the platform 2 with respect to the second marker 14 of the hub 3 thus forms a pattern 15.

The pitch measuring device 4 includes one or more optical acquisition devices 10. The optical acquisition devices 10 are accommodated in a chassis 12 including an opening facing the fan 32.

Figure 3:
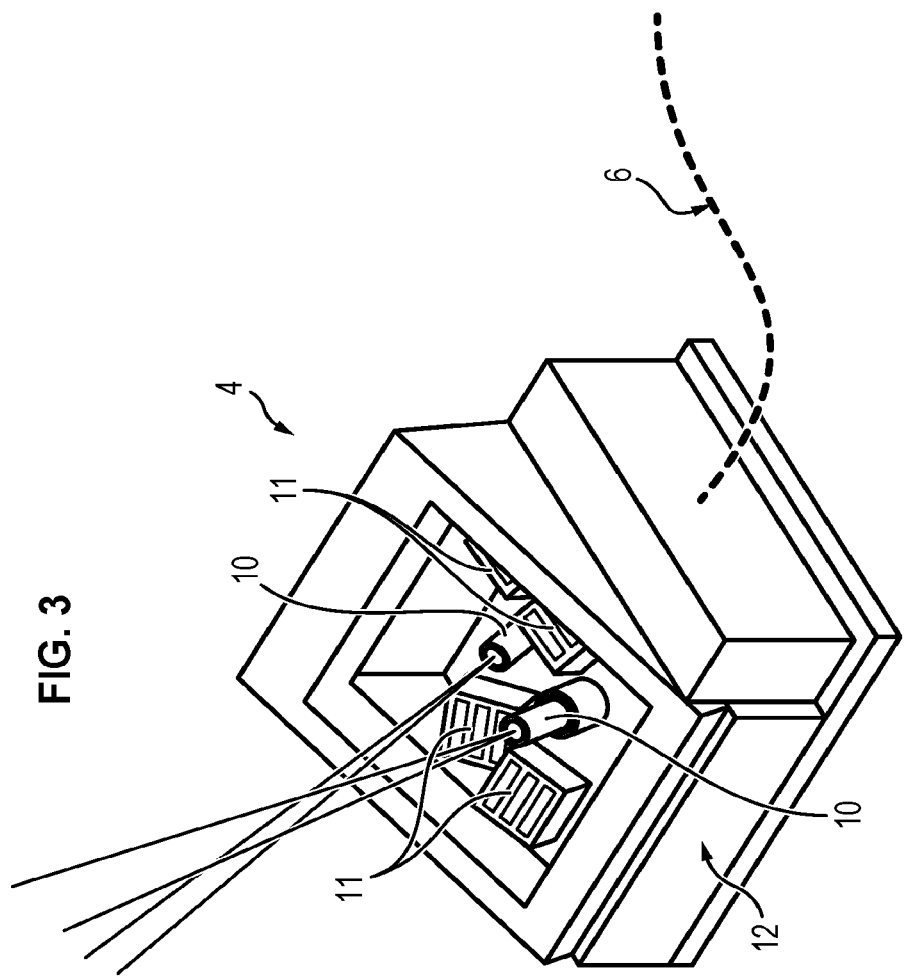
FIG. 3 is a 3D schematic of a pitch measuring device conforming to the invention.

In the embodiment shown in FIG. 3, the optical acquisition devices 10 comprise one optical acquisition device 10 per fan 32. The optical acquisition devices 10 can each comprise a camera.

Optionally, the chassis 12 can include metal plates and a rolling shutter blocking its opening so as to protect the elements contained in the chassis 12 against bad weather.

It is also practicable to supply a window covering the opening of the chassis 12. If necessary, the chassis 12 then also comprises a cooling system to avoid overheating the optical acquisition devices 10.

Each of the two optical acquisition devices 10 is directed toward a respective fan 32.

The optical acquisition devices 10 are positioned so that the pattern 15 is located in its angular field. In other words, the first and the second visual markers 13, 14 are simultaneously visible in a picture taken by the acquisition device 10.

The position and the inclination of the blade 1 necessarily creates dead zones, that is zones invisible to the optical acquisition device 10. Consequently, the dispersion and the positioning of the beads of the first and second markers 13, 14 is selected so as to guarantee that, regardless of the position and the orientation of the blade 1, at least one pattern 15 remains in the angular field of the blade 1. Thus, a number of beads allowing a predefined measurement accuracy is always visible by the camera 10.

The device 4 is placed in an area remote from the fan 32, i.e. at a distance from the fan 32.

More precisely, the pitch measuring device 4 is situated in the extension of a radial axis derived from one of the blades 1.

The pitch measuring device 4 is connected to a server 5 via a communication device 6.

The server 5 can be remote and be situated in a separate enclosure with a processing module 7, including a processor 8 and a memory 9.

Optionally, the device 4 also comprises one or more light sources 11 and/or a communication device 6.

For example, the light source 11 comprises at least one LED (for Light-Emitting Diode) spotlight. The light sources 11 are directed toward the fans, so as to increase the light intensity of the zone sampled by the optical acquisition devices 10.

In the example illustrated, the light source 11 is accommodated in the chassis 12 with the optical acquisition devices 10.

The communication device 6 can include an Ethernet and/or optical fiber link extending between the acquisition devices 10 and the server 5.

Figure 5:
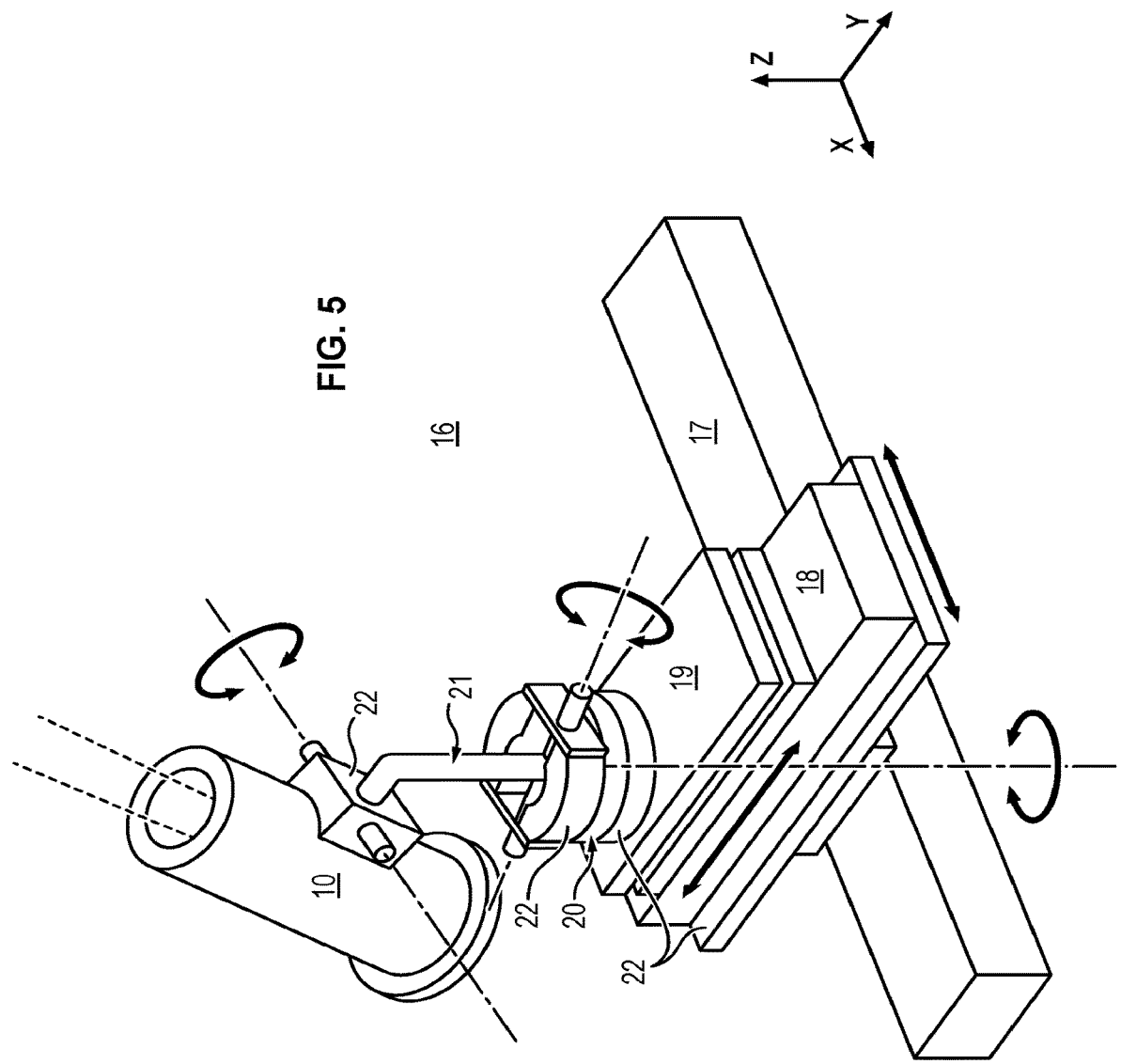
FIG. 5 is a 3D representation of a device for modifying the position of the optical acquisition device according to the invention.

With reference to FIG. 5, at least one of the acquisition devices 10 can be mounted on a movable support 16, allowing the position and the orientation of the camera 10 to be modified.

The movable support 16 comprises a longitudinal plate 17 on which is mounted in translation in a longitudinal direction a transverse plate 18.

An upper plate 19 is mounted in translation in a transverse direction on the transverse plate 18.

A pivot support 20 is rotatably mounted in an azimuthal direction on the upper plate 19.

A crank 21 is rotatably mounted in a horizontal direction on the pivot support 20, the direction having a longitudinal component and a transverse component depending on the position of the pivot support.

The optical acquisition device 10 is rotatably mounted on the crank 21, in a direction orthogonal to the direction in which the crank 21 extends.

In this manner, the optical acquisition device 10 has 5 degrees of freedom.

It is understood that the degrees of freedom of the different elements of the movable support 16 listed above can differ depending on the selected configuration and that this description is not restrictive.

Thus, the transverse plate 18 can be mounted sliding in a transverse direction, the upper plate 19 can be mounted sliding in a longitudinal direction, the pivot support 20 can be rotatably mounted in a longitudinal or transverse direction.

The crank 21 can be rotatably mounted in any direction with respect to the pivot support 20, just as the optical acquisition device 10 can be rotatably mounted in any direction with respect to the crank 21.

It is however preferable that the optical acquisition device 10 have 5 degrees of freedom, even if it is practicable for it to be adjustable according to a greater or smaller number of parameters.

Each of the relative mobilities between the different elements of the movable support 16 is driven by an actuator 22 capable of driving that mobility.

The different actuators 22 of the movable support 16 are controlled by the processing module 7.

Figure 7:
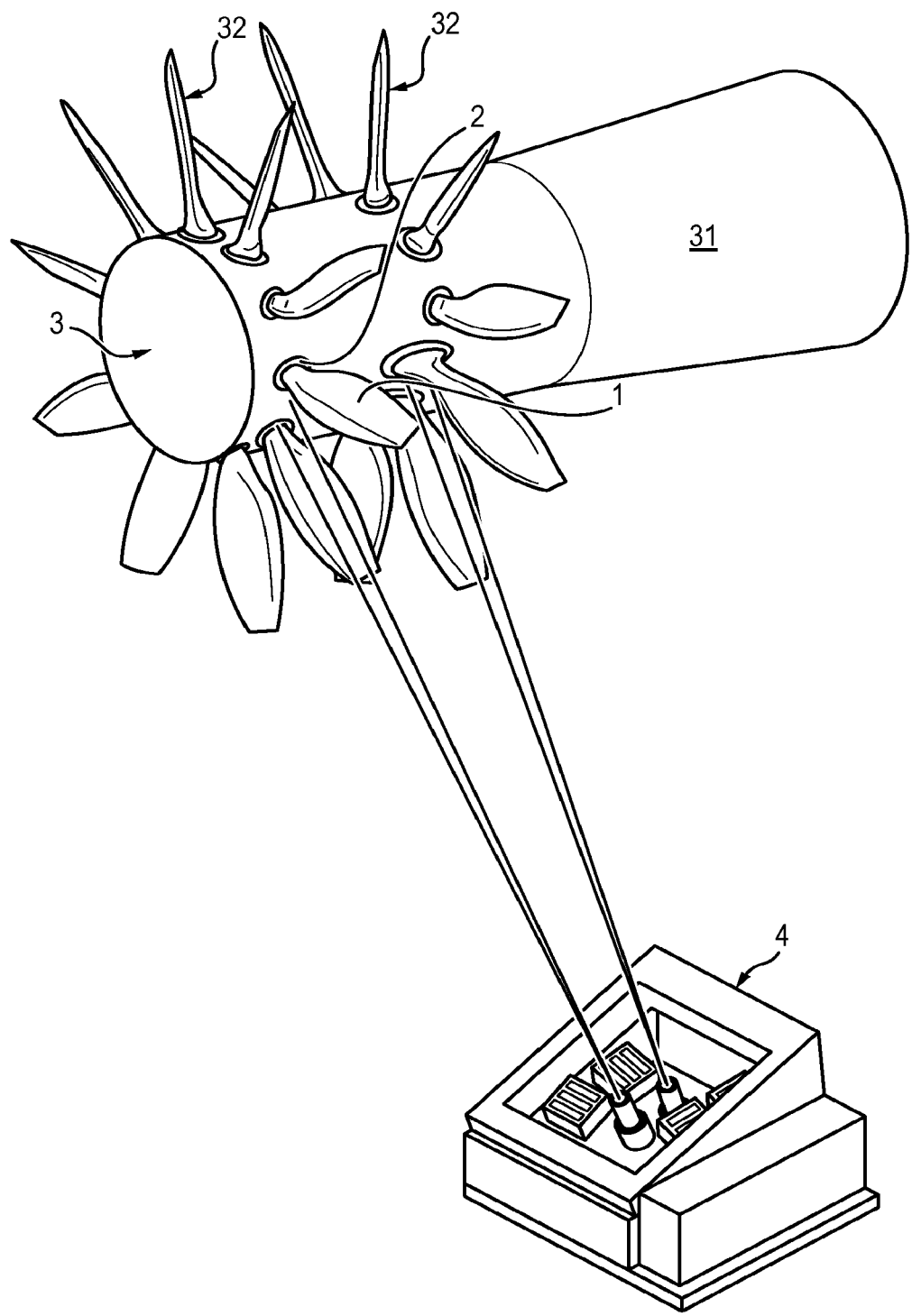
FIG. 7 is a virtual model of a pitch measuring device conforming to the invention, the virtual model being used during the simulation and the calibration of the system.

Operation:

It will be noted first of all that the device 4 allows obtaining relative angular measurements for the blades 1 of the fan 32. In order to translate these measurements into absolute angular measurements, it is possible, in one embodiment, to carry out a calibration step prior to a measurement cycle. In this manner, it becomes possible to assign a configuration of the pattern 15 to each of the pitch adjustment values of the blades 1. This calibration step is accomplished on a virtual model, illustrated in FIG. 7, of the turbomachine and of the pitch measuring device 4. In this virtual model, the pitch measuring device 4 and the fan 32 are positioned and oriented with respect to one another in a manner similar to reality. A simulated image in the virtual model therefore corresponds to each image detected by the optical acquisition device 10.

Pitch positions of the blades 1 in the fan 32 are simulated so as to determine the pattern 15 formed for these pitch positions of the blades 1.

The absolute value of the pitch simulated on the virtual model corresponding to the pattern 15 formed on the same virtual model will therefore be assigned to this pattern 15, so as to define a frame of reference.

In actual operation, the angular measurement of one blade 1 will be estimated by the device 4 based on the observed pattern 15.

It will be possible to deduce the absolute pitch of a blade 1 by comparing the pattern 15 observed by the optical acquisition device 10 during measurement with the patterns 15 simulated in the virtual model.

Then, during a first step, an image of a pattern 15 is acquired by means of the optical acquisition device 10.

To this end, when the fan 32 is turning, the angular position measuring device 30 of the hub 3 emits a signal when the blade 1 is located in a position allowing a measuring device 4 to trigger acquisition.

The optical acquisition device 10 records an image of the pattern 15 formed by the first and second visual markers 13, 14 of the blade 1 and of the hub 3.

The light sources 11 allow, by increasing the light intensity at the pattern 15 a good-quality picture to be obtained despite the shutter speed necessary for taking a clear picture of the rotating blade 1 of the fan 32.

It is possible to increase the pitch sampling speed and thus to offer better monitoring by increasing the number of blades 1 including a pattern 15. Thus, a picture is taken each time a pattern 15 passes into the field of the optical acquisition device 10. The angular position measuring device 30 of the hub 3 is then configured to emit a signal each time a blade 1 comprising a pattern 15 passes into the field of the optical acquisition device 10.

Figure 6A:
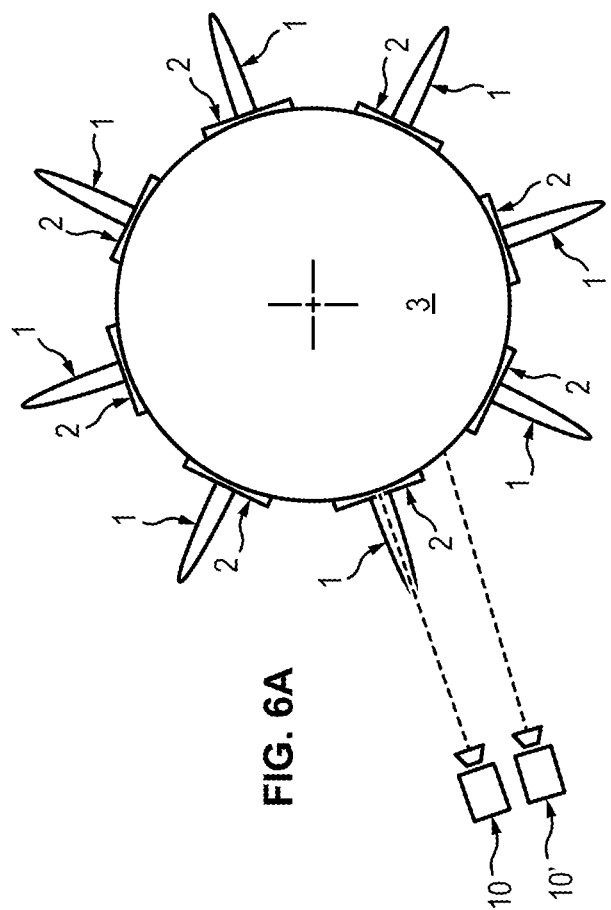
FIG. 6 is an outline schematic of the operation of a pitch measuring device according to the invention in which two optical acquisition devices are used to accomplish the monitoring of the same fan.
FIG. 6b is a representation of the tracking of the evolution of pitch over time accomplished by the two devices when their triggering times are de-phased.

It is also practicable to increase the number of optical acquisition devices 10 accomplishing the acquisition of pitch on the same fan, by dephasing the triggering time of the optical acquisition devices 10 so as to increase the sampling frequency as illustrated in FIG. 6a.

Two optical acquisition devices 10 and 10' take pictures of the same fan, their triggering being de-phased so as to increase the sampling frequency and thus improve the resolution of the pitch monitoring.

Figure 6B:
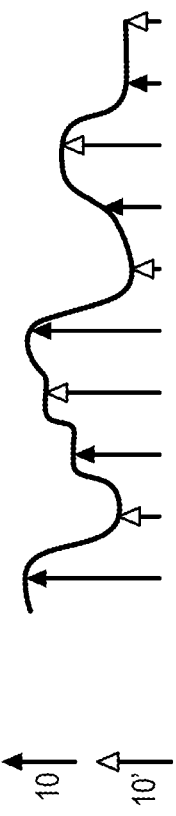

It can be observed in FIG. 6b that the monitoring achieved by means of the device 10 or the device 10' taken separately, or the synchronized association of the two devices, would not transmit as much information on the evolution of pitch during the sampling period as the de-phased association of the two devices.

During the operation of the turbomachine 31, the thrust generated can deform the structure to which the turbomachine 31 is connected, a test bench here, and cause a relative movement between the fan 32 and the pitch measuring device 4.

This relative movement can cause a loss of accuracy in the pitch measurement.

The movable support 16 of the optical acquisition device 10 can therefore be controlled to servo-control the position of the optical acquisition device 10 depending on the operating regime of the turbomachine 31, and therefore depending on the movement of the fan 32.

Thus, the optical axis of the optical acquisition device 10 remains aligned on the pattern 15 regardless of the rotational regime of the turbomachine 31. In this manner, the dead zone, that is the zone of the pattern which is hidden by the blade 1 in the picture, remains under control, thus avoiding a loss of accuracy in the measurement of pitch.

The picture is communicated to the server 5 via the communication system 6, then analyzed by the processing module 7, which can for example be a computer, a tablet or a console, or a device including a memory 9 and the processor 8.

The processor 8 implements the picture analysis method allowing the pitch of the blade 1 to be deduced from it.

During a detection step, the processing module 7 analyses the picture to detect the beads forming the pattern 15, thus identifying the formed pattern 15.

The pattern 15 is then analyzed so as to deduce the pitch of the blade 1, thanks for example to the calibration step.

Figure 8:
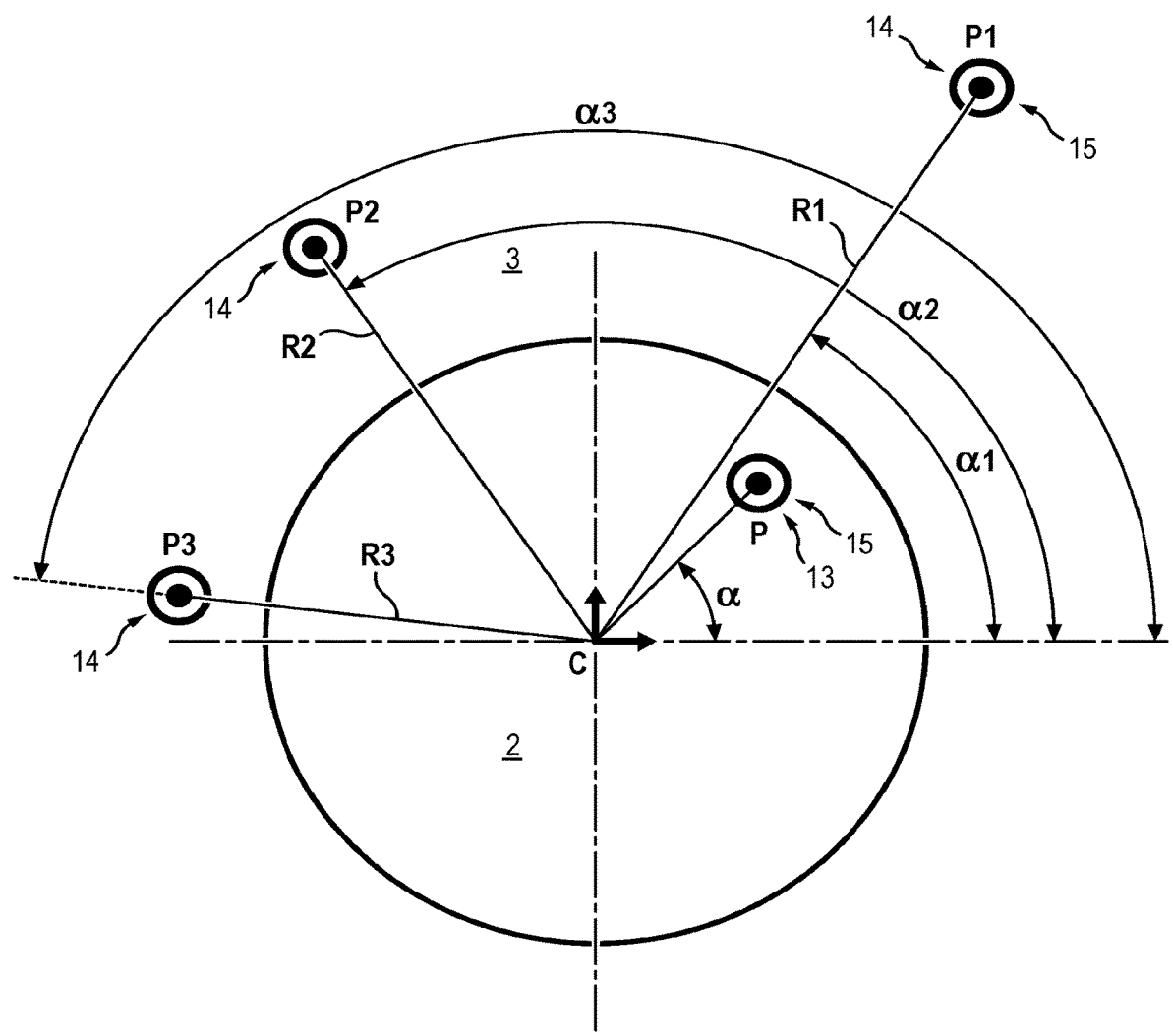
FIG. 8 is a schematic showing the geometric model used in a calculation method according to the invention which allows the pitch to be deduced based on the pattern.

With reference to FIG. 8, during the analysis, the position of a barycenter C of the pattern 15 is deduced from the position of the beads in the picture.

A reference frame is centered on the barycenter C, allowing the execution of a step of measuring different values:

The distances between the beads of the second visual marker 14 and the beads of the first visual marker 13 are measured, on the one hand, providing a measured distance $D_k$ between a bead $P_k$ of the hub 3 and a bead P of the platform 2, The angular positions of the beads $P_k$ of the second visual marker 14 with respect to the frame of reference centered on the barycenter C, supplying angles $\alpha_k$.

On the other hand, the distances between the beads of the second visual marker 14 and the beads of the first visual marker 13 are estimated on the basis of a vector calculation with respect to the barycenter C of the pattern 15, thus providing an estimated distance $D_k'$ between a bead $P_k$ of the hub 3 and a bead P of the platform 2.

For example, an estimate $D_1'$ of the distance between P and P1 would be accomplished using a well-known formula, involving the distance denoted R1 between P1 and the barycenter C of the pattern 15, the distance denoted R between P and the barycenter C, and the angle $\alpha-\alpha_k$ formed by the segments CP and CP1:

$$P1P^{2\prime}=D_1'^2=R_1^2+R^2-2\cdot R_1\cdot R\cdot\cos(\alpha-\alpha_1)$$

An angular estimate is then accomplished by summing the differences between the estimated distances $D_k'$ and the measured distances $D_k$, using a formula such as:

$$Q(\alpha) = \frac{1}{N}\sum_{k=1}^{\infty}(Dk'^2 - Dk^2)$$

In particular, according to this formula, the angle $\alpha$ representing the pitch of the blade to be retained will be that for which the cost $Q(\alpha)$ will be the lowest.

The estimate is then corrected so as to compensate for the effect of perspective caused in particular by the curvature of the hub 3 and of the platform 2 as well as the orientation of the optical acquisition device 10 with respect to the platform 2.

The measurement of pitch is therefore accomplished during the operation of the fan without the measuring device 4 having any mechanical interaction with the blade 1 or the platform 2, thus greatly simplifying the design and the integration of the device.

The invention claimed is:

1. A blade pitch measuring device of an un-ducted fan of a turbomachine, the fan comprising:
   a. a hub,
   b. at least one platform rotatable with respect to the hub and
   c. at least one blade mounted on the platform,
   wherein:
   at least one first visual marker attached to the platform,
   at least one second visual marker attached to the hub, the first and the second visual marker forming a pattern which evolves depending on the pitch of the blade and
   at least one optical acquisition device, the optical acquisition device being configured to capture an image of the pattern so as to deduce the pitch of the blade from the image of the pattern,
   wherein the device also includes a processing module including a memory, a processor and a communication device, the communication device being configured to communicate the images captured by the optical acquisition device to the processor, the memory including instructions, the processor being configured to implement the instructions of the memory so as to detect the pattern in the image and to deduce the pitch of the blade from the pattern, and
   wherein the blade pitch measuring device further comprises:
   a motor configured to rotatable drive the hub, and
   a device for acquiring an angular position of the hub configured to deliver a signal depending on the angular position of the hub,
   the processor being configured to cause the triggering of the optical acquisition device depending on the signal.

2. The blade pitch measuring device according to claim 1, also including at least one light source directed toward a zone including the pattern, so as to increase the light intensity in the zone.

3. The blade pitch measuring device according to claim 1, wherein the optical acquisition device is mounted on a movable support comprising at least one actuator allowing an adjustment of an orientation and/or of a position of the optical acquisition device with respect to the hub.

4. The blade pitch measuring device according to claim 3, also comprising a sensor configured to determine a rotation speed of the hub and a control system configured to obtain servo control of the position of the optical acquisition device depending on the rotation speed of the hub.

5. The device according to claim 1, wherein the optical acquisition device comprises a video camera.

6. The device according to claim 1, wherein the turbomachine comprises two fans and the device comprises at least one optical acquisition device per fan.

7. A method for measuring the pitch of a blade with a blade pitch measuring device according to claim 1, including the steps of:
   a. acquiring an image of a pattern with the optical acquisition device,
   b. detecting the pattern in the acquired image, c. analyzing the detected pattern so as to deduce a value of the pitch of the blade from the pattern.

8. The method for measuring the pitch of a blade according to claim 7, also comprising a calibration step during which the fan and the device are digitally simulated so as to simulate the position of a blade for at least one pitch value, thus forming a configuration of the pattern corresponding to the simulated pitch value, so as to assign a reference pitch value for the simulated configuration of the pattern.

* * * * *

UNITED STATES PATENT AND TRADEMARK OFFICE
CERTIFICATE OF CORRECTION

PATENT NO.       : 10,851,657 B2
APPLICATION NO.  : 16/220213
DATED            : December 1, 2020
INVENTOR(S)      : Polo Filisan et al.

Page 1 of 1

It is certified that error appears in the above-identified patent and that said Letters Patent is hereby corrected as shown below:

In the Specification

In Column 3, Line 29, delete "FIG. 6" and insert -- FIG. 6A --, therefor.

In Column 3, Line 33, delete "FIG. 6b" and insert -- FIG. 6B --, therefor.

In the Claims

In Column 8, Claim 1, Line 37, delete "rotatable" and insert -- rotatably --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*